Feb. 24, 1970   R. E. CLARKE   3,497,106
FLOWMETER
Filed Feb. 3, 1969   3 Sheets-Sheet 2
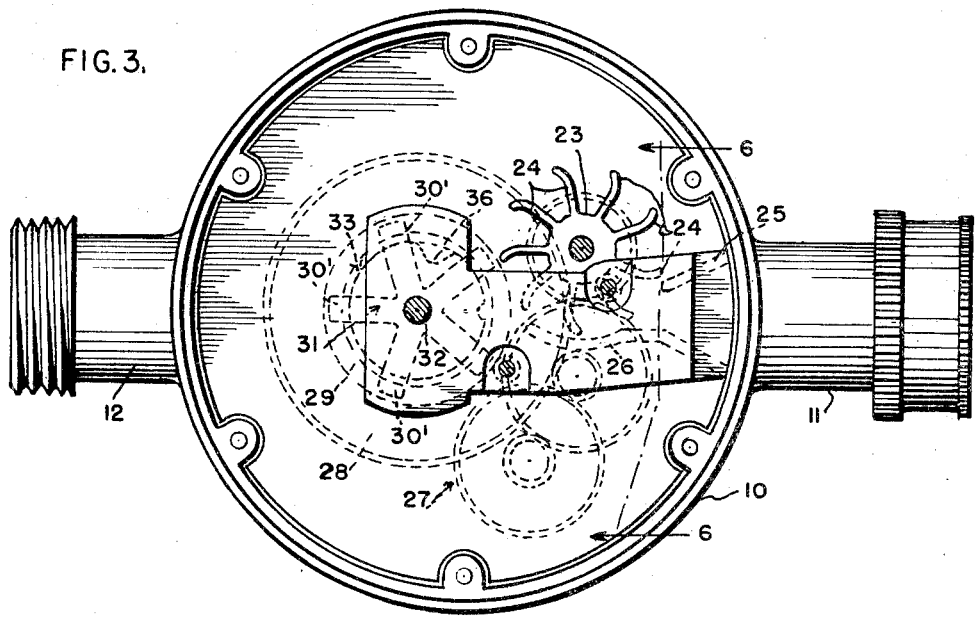
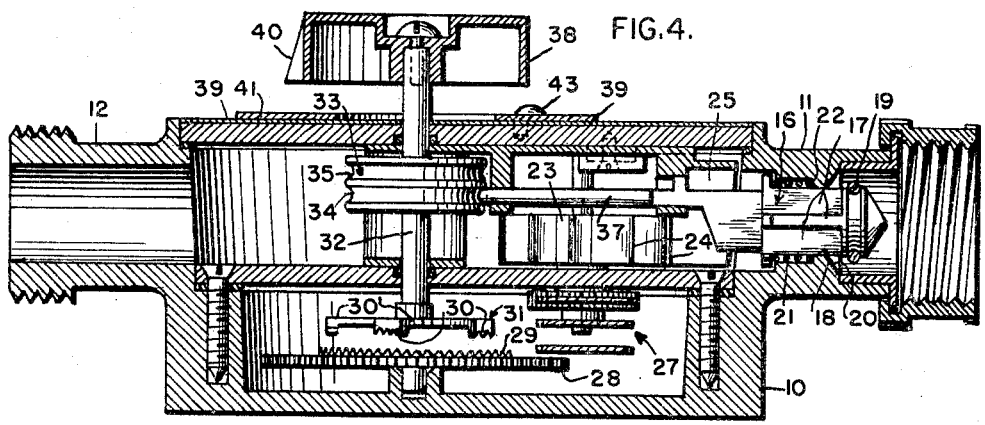
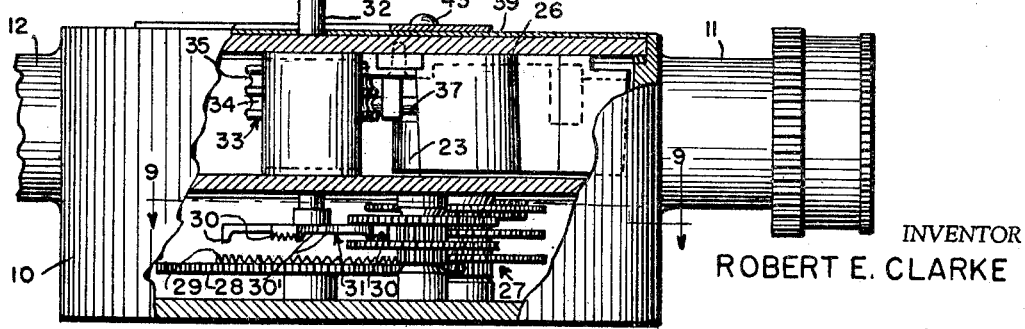
INVENTOR
ROBERT E. CLARKE
BY
ATTORNEY

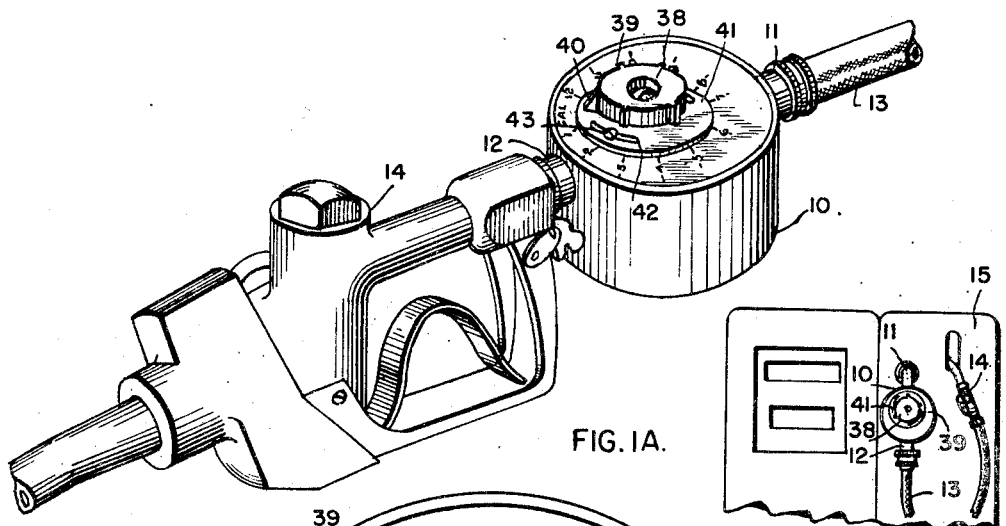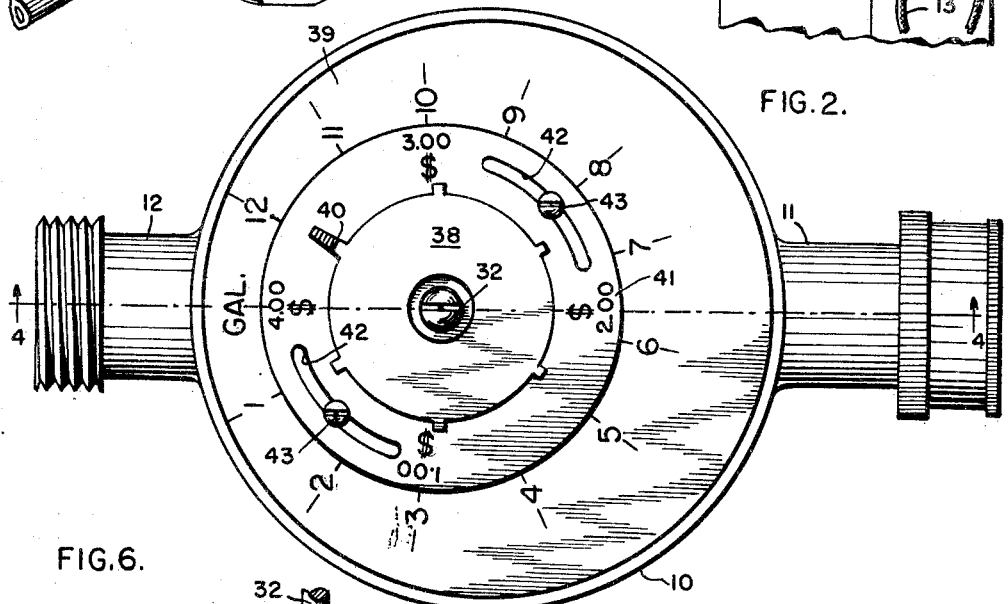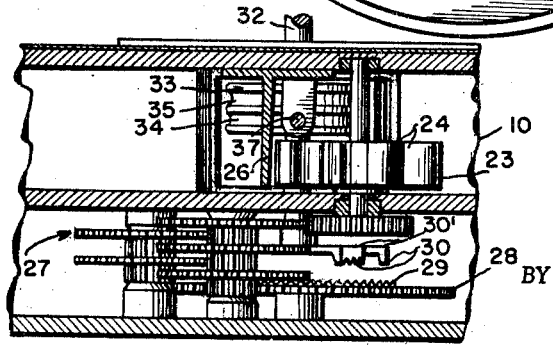

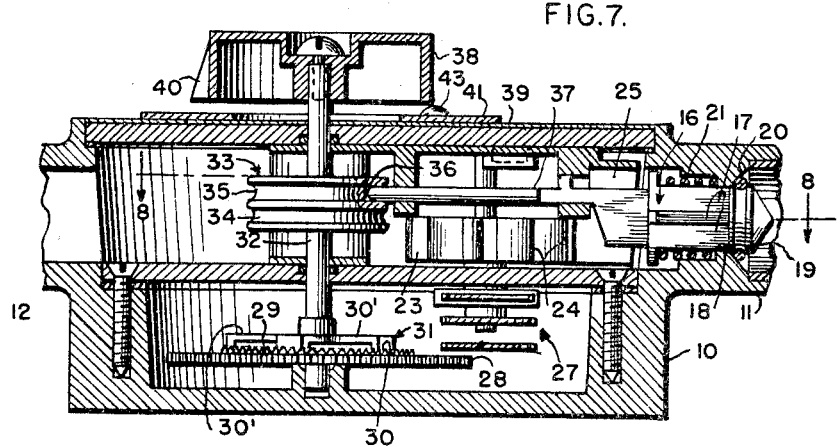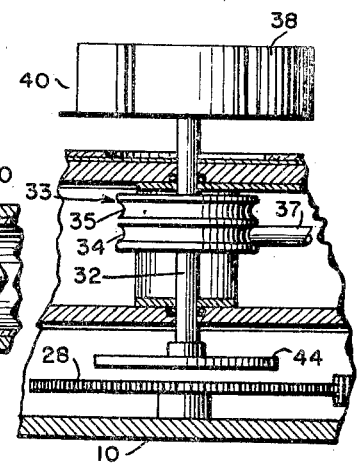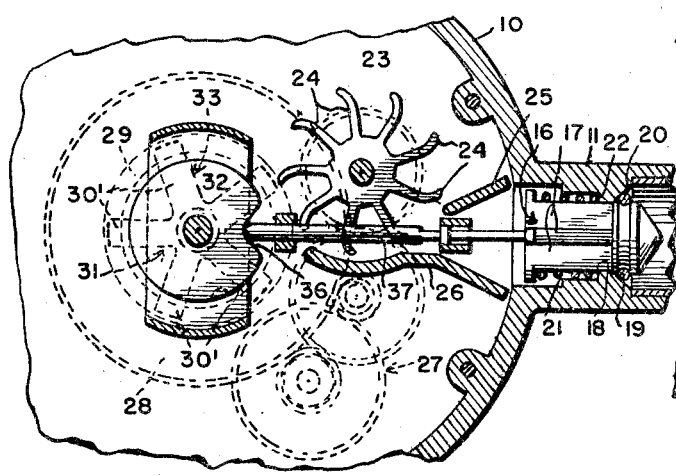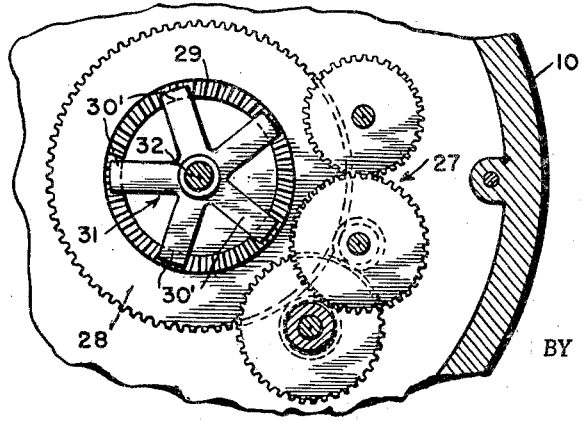
INVENTOR
ROBERT E. CLARKE
ATTORNEY

United States Patent Office 3,497,106
Patented Feb. 24, 1970

3,497,106
FLOWMETER
Robert E. Clarke, 1410 Saratoga Drive,
Bel Air, Md. 21014
Filed Feb. 3, 1969, Ser. No. 814,473
Int. Cl. B67d 5/30
U.S. Cl. 222—20                      5 Claims

ABSTRACT OF THE DISCLOSURE

A meter for measuring the amount of liquid flowing through a conduit from a source of supply to a delivery point. A rotary impeller driven by the flow of liquid through the meter, an indicator shaft driven through a reduction gearing by the impeller and a cut-off valve actuated by the indicator shaft, the cut-off valve functioning to stop the flow of liquid after the pre-set amount of liquid or the amount of liquid represented by a pre-set price on the indicator has been reached, the valve being a reciprocating spring actuated valve operated by a cam disc on the indicator shaft and a manually operated clutch means on the indicator shaft to render the cam disc inoperative and hold the valve open for free unmetered flow of the liquid through the device when desired.

---

This invention relates to meters and more specifically to meters of the type for use in conjunction with gasoline pumps such as are commonly used in filling stations for delivery of gasoline to a customer's car.

It is one object of my invention to provide such a meter which not only will give accurate readings of amounts of gasoline delivered and/or the price of the amount delivered, but which may also be pre-set to deliver a predetermined amount measured either in liquid measure or price and which will automatically shut off when the predetermined amount is delivered.

Another object is to provide such a meter in which the automatic shut-off feature may be readily disengaged, if desired, to allow free unmetered flow of gasoline therethrough.

Still another object is to provide a meter of this character which is relatively cheap to manufacture, trouble free in operation and rugged in character.

The above and other objects and advantages will become more apparent as this description proceeds, reference is had in this description to the accompanying drawings forming a part of this specification and in which like characters of reference refer to like parts. In said drawings, FIGURE 1 is a perspective view of a meter according to my invention installed in the delivery hose of a gasoline filling station pump directly behind the delivery valve;

FIGURE 1-A is a fragmentary perspective view of a filling station pump showing the meter installed on the housing thereof adjacent the outlet or delivery pipe of the pump;

FIGURE 2 is a top plan view of the meter;

FIGURE 3 is a view similar to FIGURE 2 with the knob, top cover and certain internal parts removed;

FIGURE 4 is a section on line 4—4 of FIGURE 2;

FIGURE 5 is a fragmentary side view partly broken away and in section to show certain internal features;

FIGURE 6 is a fragmentary section substantially on line 6—6 of FIGURE 3;

FIGURE 7 is a view similar to FIGURE 4 with the metering and automatic shut-off mechanism in engaged position;

FIGURE 8 is a section on line 8—8 of FIGURE 7;

FIGURE 9 is a fragmentary sectional view substantially on line 9—9 of FIGURE 5; and FIGURE 10 is a fragmentary sectional view showing the indicator and valve actuating shaft with a modified form of disengageable clutch thereon.

Referring to the drawings in detail and to the various parts of the meter as depicted therein, 10 represents a casing of any convenient shape having an inlet pipe 11 and an outlet pipe 12. The inlet pipe may be conveniently connected between the delivery hose 13 and the delivery valve 14 of a filling station gas pump as shown in FIGURE 1, or it may be fixedly attached to the housing 15 of the gas pump in series with the outlet pipe and delivery hose of the pump as shown in FIGURE 1-A.

Within the inlet pipe 11 there is a reciprocating valve body 16 having a section formed with four longitudinal ribs 17 which slidably guide the valve body in a cylindrical bore 18 within the inlet pipe.

The valve body 16 carries a sealing ring 19 adjacent one end which cooperates with the seat 20 in the inlet pipe in one position to close off the fluid flow therethrough. A spring 21 acting on the valve body and a shoulder 22 in the inlet pipe urges the valve toward closed position. The valve may be held in open position as shown in FIGURE 4 for flow of fluid through the meter by mechanism hereinafter described.

An impeller wheel 23 is journalled within the casing and is driven or rotated by the fluid flow impinging against the vanes 24 thereof (see FIG. 8). The fluid is directed against the impeller vanes by means of angularly arranged housing walls 25 and 26 and rotates the impeller as it flows by.

The impeller transmits its rotary motion through a reduction gearing generally designated 27 to a master or final gear 28 journalled in the casing. The ratio of reduction in revolutions from the impeller wheel to the final or master gear is optional depending on how many units of fluid measure it is desired to be indicated on the dial of the meter for each complete revolution of the indicator over the dial.

One face of the master or final gear is provided with radially extending V-shaped teeth 29 which cooperate with similar teeth 30 on the fingers 30' of a spider element 31 and when the teeth on the master gear and spider element are engaged these two elements will rotate as a unit.

The spider element fingers 30' are somewhat flexible and although the material of the spider element is not important it has been found that making this element of plastic such as nylon is very suitable.

The spider element 31 is carried by a shaft 32 journalled in the casing which latter shaft extends outwardly through the top of casing 10. The shaft 32 carries a generally circular cam member 33 within the casing and said cam member is provided with two peripheral grooves 34 and 35. The groove 34 is of uniform depth throughout and its bottom or root surface is concentric with the shaft 32. The groove 35 is also concentric with the shaft 32 for the greater portion of its peripheral extent but at one point is provided with a notch 36 substantially deeper than the groove 35.

Cooperating with the grooves 34 and 35 is a push rod 37 mounted for sliding movement in the casing and connected to the valve member 16. The spring 21 which normally acts on the valve member 16 to urge the latter toward closed position will thus tend to urge the push rod 37 against the root surface of the groove 34 or 35, depending on which of the latter grooves in the cam member is opposite the push rod at the particular time.

The shaft 32 is movable longitudinally in its bearings in the casing and may be shifted from a position in which the push rod occupies groove 34 to a second position in which the push rod occupies groove 35 by merely manually shifting the rod from one position to the other. To facilitate such manual shifting of the shaft 32 the upper end thereof which extends outwardly of the casing is equipped with a knob 38.

It should be noted that when the shaft 32 with the attached cam member 33 is in such position that push rod 37 occupies groove 34 the spider member is entirely disengaged from the master gear 28 and the teeth 29 and 30 on the master gear and spider are out of contact and the master gear may turn without driving the spider 31 and shaft 32 with its attached cam member and knob. However, when the shaft 32 is shifted longitudinally so as to position the push rod in groove 35 of the spider, the spider will be moved so that the teeth 30 thereon will engage the teeth 29 of the master gear and rotation of the latter will be transmitted to shaft 32 with its attached cam member and knob. Also when the cam member is positioned with the push rod in either groove 34 or 35 the valve will be held in open position allowing flow of fluid through the meter. However, when the push rod is in groove 35 and the shaft rotates to the point where notch 36 is opposite the push rod the latter will be urged into the notch by the spring 21 and the valve member 16 will move to close the valve.

The top of the casing 10 is provided with a fixed graduated indicator dial 39 as shown in FIGURE 2, marked off in units of liquid measure such as gallons and the knob 38 is provided with a pointer 40. The pointer is located with respect to the notch 36 in groove 35 of the cam such that the pointer will indicate zero when the push rod is in notch 36 and the valve is closed. Thus it may be seen that merely turning the knob 38 to the number of units of measure to be delivered and moving the same to shift the cam to a position wherein the push rod occupies groove 35 therein and the spider element 31 engages the master gear 28, the fluid will flow through the meter until the knob pointer reaches the zero mark whereupon the push rod will be urged into the notch 36 and the valve closed and the pre-set number of units of liquid will have flowed through the meter.

In addition to the fixed dial 39 the meter may also be provided with an adjustable dial 41 graduated in price per unit of liquid measure. It may thus be seen that automatic delivery of a pre-set amount of liquid based on price per unit of measure may be delivered if desired. The adjustable dial 41 may be rotatably adjusted and clamped in various positions by means of the arcuate notches 42 and screws 43 to provide for a range of prices per unit of liquid measure.

FIGURE 10 shows a modification in which a friction disc 44 replaces the spider member 31 in the combination previously described. In this form frictional contact between disc 44 and the face 28' of master gear 28 is sufficient to rotate the shaft 32 and its associated parts. While the modified form in FIGURE 10 shows a friction drive for the shaft 32, the shaft may be driven by any of the well-known conventional clutch means, such as, a continuous intermeshing gears, a magnetic or fluid clutch, etc.

Having described preferred forms of the device, it is to be understood that the invention is not intended to be limited thereto.

I claim:
1. A device for predetermining the quantity of fluid flowing through a pipe line comprising,
    (a) a casing having fluid inlet and outlet openings for flow of fluid therethrough,
    (b) a fluid motor within the casing driven by the flow of fluid,
    (c) a rotary driven member journalled in the casing and coupled to the fluid motor and driven thereby,
    (d) a shaft journalled in said casing in coaxial relationship with said rotary driven member and manually axially shiftable in said casing,
    (e) a clutch between said shaft and said rotary driven member, said clutch being manually engageable and disengagable by axially shifting said shaft,
    (f) a cam mounted on said shaft,
    (g) a valve in said fluid conduit,
    (h) means connected to said valve and operable by said cam when said shaft is shifted to clutch engaging position to close said valve at a predetermined position of rotation of said cam, and
    (i) additional means mounted on said shaft and responsive to longitudinal motion thereof and engaging said means connected to said valve and operable to open and hold said valve open when the shaft is shifted to disengage said clutch.

2. The structure defined in claim 1 in which the clutch comprises radial teeth on said rotary driven member and a spider member on said shaft, said spider member having flexible radial fingers with radial teeth cooperable with the radial teeth on said rotary driven member whereby the spider member will be driven by said rotary driven member when the cooperable teeth are engaged.

3. The structure defined in claim 1 in which said clutch comprises a friction disc on the end of said shaft cooperable with a face of said rotary driven member whereby upon axially shifting said shaft said friction disc is engaged or disengaged from said rotary driven member.

4. The structure defined in claim 1 in which the shaft extends outwardly of the casing and carries a knob and pointer and a graduated scale is fixed to the casing below the knob and pointer, whereby the knob may be used to engage and disengage the clutch by axial movement thereof and rotated to set the pointer to predetermine the amount of fluid to be delivered through the device.

5. The structure defined in claim 4 in which a second adjustable scale is mounted below the knob and pointer, the first scale being graduated in units of fluid measure and said second adjustable scale being graduated in price per unit of fluid measure.

References Cited

UNITED STATES PATENTS

| | | | |
|---|---|---|---|
| 960,946 | 6/1910 | Jones | 22—29 X |
| 2,224,540 | 10/1940 | Fraser | 222—20 X |
| 3,187,943 | 6/1965 | Wolf | 222—20 |

ROBERT B. REEVES, Primary Examiner

H. S. LANE, Assistant Examiner